United States Patent [19]

Picandet

[11] Patent Number: 5,014,269
[45] Date of Patent: May 7, 1991

[54] MICROCOMPUTER INTEGRATING A DIGITAL SUBSCRIBER TERMINAL FOR AN INTEGRATED SERVICE DIGITAL NETWORK

[75] Inventor: Jean A. Picandet, Paris, France

[73] Assignee: J. S. Telecommunications, Louveciennes, France

[21] Appl. No.: 374,132

[22] Filed: Jun. 30, 1989

[30] Foreign Application Priority Data

Jul. 8, 1988 [FR] France .................. 88 09352

[51] Int. Cl.⁵ .............................. H04Q 3/00
[52] U.S. Cl. .................. 370/85.11; 370/110.1
[58] Field of Search ............. 370/85.11, 110.1, 85.9

[56] References Cited

U.S. PATENT DOCUMENTS

| | | | |
|---|---|---|---|
| 4,463,351 | 7/1984 | Chiarottino | 370/85.2 |
| 4,640,989 | 2/1987 | Riner et al. | 379/94 |
| 4,663,748 | 5/1987 | Karbowiak | 370/85.12 |
| 4,740,955 | 4/1988 | Litterer | 370/85.11 |
| 4,757,497 | 7/1988 | Beirle | 370/85.12 |
| 4,821,034 | 4/1989 | Anderson | 370/63 |
| 4,823,338 | 4/1989 | Chan | 370/85.1 |
| 4,835,769 | 5/1989 | Donaghue | 370/85.1 |
| 4,864,601 | 9/1989 | Berry | 370/125 |
| 4,866,703 | 9/1989 | Black | 370/110.1 |

FOREIGN PATENT DOCUMENTS

| | | |
|---|---|---|
| 0192894 | 9/1986 | European Pat. Off. . |
| 3534918 | 4/1987 | Fed. Rep. of Germany . |
| 8710902 | 7/1987 | France . |
| 8715511 | 11/1987 | France . |
| 58-69193 | 4/1983 | Japan . |

OTHER PUBLICATIONS

Jaggernauth et al., "ISDN Attendant Console," IEEE Int'l. Conference on Communications 1986, Conference Record, vol. 2, pp. 1247-1249.
D. Adolph, "Subsets, Terminals, and Terminal Adapters for the Public ISDN," Electrical Communication, vol. 61, No. 1, pp. 72-80.
Lavoisard et al., "Les Installations Terminales D'Abonnes," Commutation & Transmission, vol. 9, No. 3, Sep. 1987, pp. 35-50.
Newman, "An ISDN Data and Voice Terminal Based on a Personal Computer," Globecom '85-IEEE Global Telecommunications Conference, Conference Record, vol. 3, pp. 1048-1052.
Pederson et al., "The PC/PBX Connection," AT&T Technology, vol. 1, No. 1, 1986, pp. 36-37.

*Primary Examiner*—Douglas W. Olms
*Assistant Examiner*—Melvin Maralo
*Attorney, Agent, or Firm*—Rines and Rines; Shapiro and Shapiro

[57] ABSTRACT

A microcomputer integrates a Digital Subscriber Terminal (DST) adapted to an Integrated Services Digital Network (ISDN). In addition to the electronic circuit boards that ensure all the normal data processing and management functions (central processing unit, input/output circuits, ROM and RAM circuits), the microcomputer is equipped with an additional set of circuit boards for interfacing with an ISDN system, so as to constitute a microcomputer-contained DST for an ISDN. The management and switching of data concerning the ISDN system are provided by the additional set of circuits, so that the DST function is achieved without calling on the resources of the microcomputer's central processing unit. In this way, the essential telephone switching function is obtained without calling on the PC's central processing unit, while the integration of the DST within the PC makes it possible to benefit from the computer's data processing functions with a minimum amount of equipment for a maximum number of functions.

12 Claims, 3 Drawing Sheets

MICROCOMPUTER INTEGRATING A DIGITAL SUBSCRIBER TERMINAL FOR AN INTEGRATED SERVICE DIGITAL NETWORK

FIELD OF THE INVENTION

The present invention aims to integrate within a microcomputer a digital subscriber terminal for an integrated service digital network.

BACKGROUND OF THE INVENTION

Microcomputers, or personal computers (PCs), were initially designed for data processing.

It has been suggested to insert PC-format electronic circuit boards serving as an interface or a terminal adapter to provide a connection between a telephone set or a workstation and a network such as an Integrated Service Digital Network (ISDN). Such electronic circuit boards are, for instance, described in the following documents:

- "ISDN attendant console" by J. Jaggernauth et al, "IEEE INTERNATIONAL CONFERENCE ON COMMUNICATIONS 1986", Conference Record, vol. 2, p. 1247-1249,
- "Subsets, terminals, and terminal adapters for the public ISDN" by D. Adolph, "ELECTRICAL COMMUNICATION", vol. 61, no. 1, 1987, p. 72-80,
- "Les installations terminales d'abonnés" by J. L. Lavoisard et al, "COMMUNICATION ET TRANSMISSION", vol. 9, no. 3, September 1987, p.35-50,
- U.S. Pat. No. 4,640,989, and
- an "ISDN data and voice terminal based on a personal computer", B. Newman "GLOBECOM '85- IEEE GLOBAL TELECOMMUNICATIONS CONFERENCE" Conference Record, vol. 3, p. 1048-1052.

These electronic circuit boards do not provide any switching function. The same is ture of electronic circuit boards intended to line a PC to a digital telephone set, one of the above two elements being connected to a private branch exchange (PBX) as described in the article "The PC/PBX Connection", by K. Pederson et al, AT & T TECHNOLOGY, vol. 1 no. 1, 1986, p. 36-37.

There have recently appeared Digital Subscriber Terminals (DSTs) for ISDNs that connect to a public network through several T interfaces. These DSTs (also known as subscriber mains) are capable of locally linking up telephone or data terminals basically by ensuring a switching function. DSTs thus appear as Intercom or PABX (Private Automatic Branch eXchange) type private exchanges that ensure both speech and data switching. A description of a DST is given in the J. L. Lavoisard et al article cited above.

It has also been suggested to integrate a PABX function into a PC. For instance, European Patent Application No. EP 0 192 894 discloses a microcomputer in which is inserted an electronic circuit board having line interface circuits, a user interface circuit and a PABX controller circuit interconnected via a circuit board bus. The PABX controller is connected to the microcomputer bus.

With this arrangement, the telephone function makes heavy use of the microcomputer's resources. Here, the telephone function, especially as regards switching of line-transmitted data, is managed on a time-sharing basis by the microcomputer's central processing unit. There is consequently a risk of disruption from applications other than the telephone function and which still need to be improved, such as writing into incorrect memory zones and overuse of common units (processor and memories). Moreover, a common bus is used for both the telephone function and the other microcomputer applications. There is therefore a risk of the bus being taken up by other applications at the expense of the data flow required for the telephone function. Finally, the inclusion of circuits providing a telephone function within a single board considerably increases the likelihood of faults developing and is incompatible with good modularity practice.

These same drawbacks are found with the solutions proposed in documents DE 3 534 918 and JP 58-69 193 since in both cases the telephone switching function is also ensured by the microcomputer's central processing unit.

SUMMARY OF THE INVENTION

The object of the present invention is to provide the integration of an ISDN digital subscriber terminal (DST) within a PC while avoiding all the drawbacks of the solutions put forward in the above cited documents.

This object is achieved through a microcomputer that includes:
- first electronic circuit boards on which are fitted first circuits providing the PC's central processing unit, input-output, and memory functions, and which are interconnected via a first bus, and
- at least a second electronic circuit board specifically incorporating interface circuits for connecting a plurality of terminals to an IDSN through line means,
- means being provided for switching of data transmitted over said line means so as to constitute a DST integrated within the PC, wherein, according to the invention, the management and switching of data transmitted over said line means and the required signalling for exchanging said data, are carried out by management and switching circuits provided on said at least one second electronic circuit board, so that the DST function is achieved without calling on the resources of the central processing unit of the microcomputer.

In this way, the essential telephone switching function is obtained without calling on the PC's central processing unit, while the integration of the DST within the PC makes it possible to benefit from the data processing functions afforded by the latter with a minimum amount of equipment for a maximum number of functions.

In particular, the PC can be made to carry out tasks which, although not essential for telephony, provide a good number of features for the user. Examples of tasks that can be accomplished by the PC include: itemized billing, a communications logbook, traffic measurement, directory function, installation configuration and maintenance, protocol conversions, etc.

The circuits providing the DST functions are mounted on several second electronic boards which are advantageously interconnected by a second bus that is separated from the first PC bus. In this way, data exchanges between the DST board and the controlling parts of the PC use the first PC bus, while exchanges between DST boards, in particular concerning telephone operation and telephone switching, make preferential use of the second bus.

The second bus includes one or several lines grouping number data transmission channels of which at least one is used as a signalling channel. The data transmission lines can be eg. of the pulse code modulation (PCM) type each conveying a time multiplex of synchronous channels. In addition, the second bus advantageously includes its own supply line as well as its own time base distribution line. In this way, the telephone function can still be maintained when the PC is off.

Signal collisions on a signalling channel are avoided through the use of access procedures in accordance with a contention protocol such as a CSMA/CR (Carrier Sense Multiple Access/Collision Resolution) or CSMA/CD (Carrier Sense Multiple Access/Collision Detection) protocol, or by fitting the second bus with an arbitration line for sharing the use of the signalling channel between the different second boards.

BRIEF DESCRIPTION OF THE DRAWINGS

Other characteristics and advantages of the invention will become clear after reading the following description, given as a non-limiting example, with reference to the accompanying drawings in which.

DETAILED DESCRIPTION OF THE PREFERRED EMBODIMENTS

Figure 1:
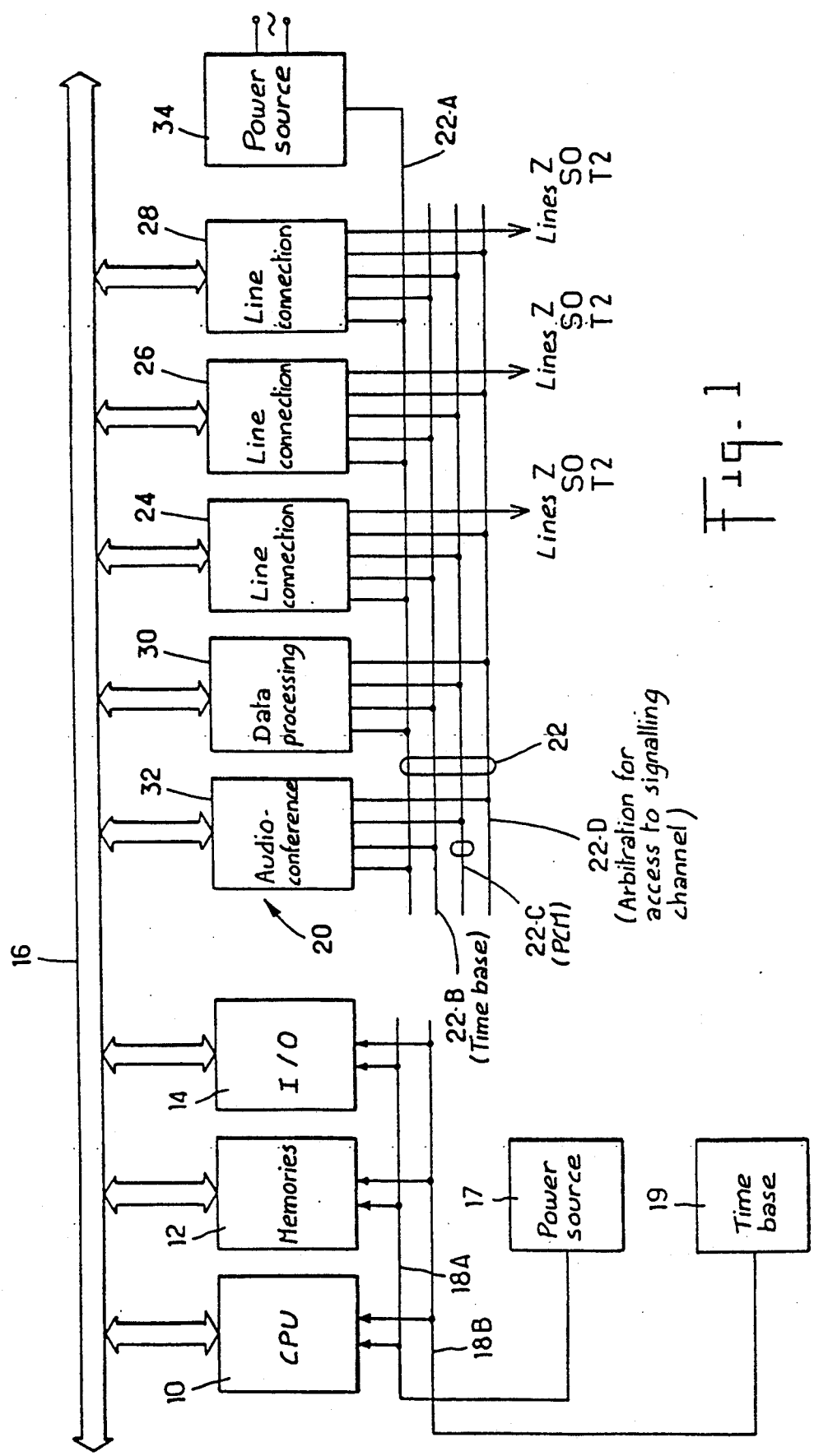
FIG. 1 is a block diagram showing how a DST for an ISDN is integrated within a PC according to a specific embodiment of the invention.

The PC—whose functional block diagram is shown in FIG. 1—contains, as is known in the art, a CPU circuit 10, ROM (program) and RAM (data) memory circuits 12 and input/ouput circuits 14 for connection to PC peripherals, such as a monitor-keyboard and a printer (not shown). These various circuits are contained in different electronic circuit boards (not shown in FIG. 2), and are interconnected by a common parallel bus 16. A line 18A ensures electrical energy distribution to circuits 10, 12 and 14 from a source 17, while a line 18B distributes clock signals to these same circuits from a time base 19.

According to the invention, the PC further includes circuits, forming a DST 20 for an ISDN which are constructed on PC-format electronic circuit boards. These circuits serve from the telephony functions and data transmission in an ISDN environment.

The circuits forming the DST are connected to the parallel PC bus 16 and interconnected by a communication bus 22, which is distinct from bus 16 and serves to convey the exchanges concerning the running of the telephony functions and telephone switching.

The DST 20 specifically includes line connection circuits 24, 26, 28, data processing circuits 30 and audioconference circuits 32.

The line connection circuits allow connection of telephone lines, as in a normal exchange, to link a plurality of local terminals amongst themselves and to the ISDN. These circuits can present Z-type analog interfaces and/or ISDN interfaces, in particular of the U, TO, T2, SO and S2 type. In the example shown, circuits 24, 26, 28 present Z, SO and T2 type interfaces.

Figure 2:
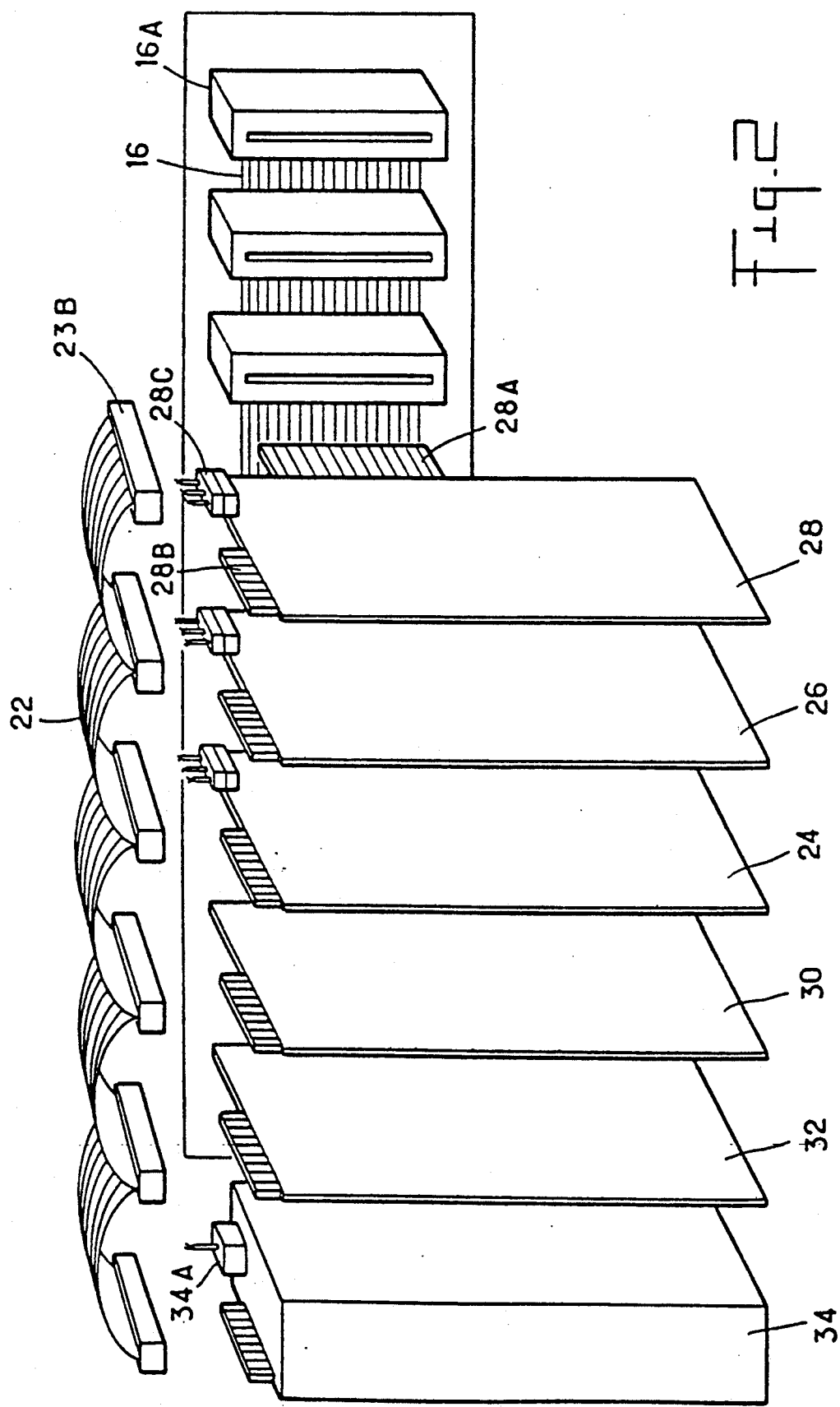
FIG. 2 is an exploded view showing an example of how the DST electronic circuit boards are physically installed in a PC.

As shown in FIG. 2, circuits 24, 26, 28 are fitted on electronic circuit boards. Each of these boards, eg. board 28, includes a first set of contacts 28A intended to be plugged into a corresponding connector 16A for connection to the PC's parallel bus 16, a second set of contacts 28B intended to be plugged into a corresponding connector 23B for connection to the communications bus 22, and a terminal 28C from which lines are taken out to the local terminals or the ISDN.

Data processing circuits 30 serve as crossovers between buses 16 and 22. For instance, these circuits can receive data via the PC's parallel bus 16 and, format the information into serial data packets in order to send them to line connection circuits via bus 22. Conversely, the data processing circuits can receive data packets via bus 22 and put them into suitable form for transmission to the PC's own circuits.

Audioconference circuits 32 allow voice signals to be added to provide teleconferencing between three or more parties. These circuits may eg. be of the type described in French patent application No. FR 87 10 902 of Jul. 31st. 1987. The audioconference circuits 32 are essentially connected to the communications bus 22 to carry out the voice signal additions between the time channels concerned by the conferences.

As is shown in FIG. 2, the data processing circuits 30 and the audioconference circuits 32 are fitted on boards connected to buses 16 and 22.

With the above-described architecture, data exchanges between the DST 20 and the controlling part of the PC use PC bus 16, while signal exchanges concerned with the running of the ISDN telephony, and in particular the telephone switching, essentially use bus 22.

In order that the telephone functions remain independent of the other PC functions, bus 22 includes:

its own electrical power distribution line 22-A, its own time base distribution line 22-B, one or several PCM 22-C lines that each convey a synchronous channel multiplex at 64 kbits/s, one of these channels being used to form a single signalling channel having a flow-rate of 64 kbits/s or n×64 kbits/s (n being a whole number greater than or equal to 1), and, optionally, an arbitration line for access to a signalling channel.

The electrical power distributed by line 22-A is delivered by a power supply circuit 34 that is independent of the PC's power supply 17 so as to remain operational when the latter is turned off. Preferably, the power supply circuit 34 has a battery back-up. As shown in FIG. 2, circuit 34 is fitted on a specially provided board connected to bus 22 and having a pin 34 for connection to its electrical supply network.

The time base function is obtained eg. as described in French patent No. FR 87 15 511 of Nov. 9th. 1987. The signals supplied to the time base are generated by one of the DST's line connection circuits, independently of circuits 19, and are transmitted to the other DST circuits via line 22-B.

The PCM 22-C lines serve for information transfer (data or speech) between the DST circuits as well as—using of the DSTs as a signalling channel—for telephone signalling exchanges, whereas the signalling with the computing part of the PC (e.g., data exchange between the DST and the computing part of the PC) is conducted through the PC bus 16 intended for that purpose.

Two types of telephone messages can be used:
addressed messages for exchanges between one DST circuit and another, and
broadcast messages, sent out by one of the DST circuits and received by the others.

Only one message can be sent out at a time on the signalling channel to avoid signal collisions. To that end, the signalling channel access procedure preferably follows a CSMA/CR protocol using the address of each circuit. According to this protocol, should two circuits attempt to send out data simultaneously, only the one having the highest address will be able to transmit, the other one being blocked during the message transmission period and forced to transmit afterwards.

An anti-collision procedure according to another contention protocol, such as a CSMA/CD protocol can also be used.

Circuits capable of managing protocol contentions are well known. One example includes the SAB 82525 HSCX component from SIEMENS.

A signal collision on the signalling channel can also be avoided with the provision of an arbitration line 22-D (FIG. 1) in bus 22.

As an alternative, the 22-C lines conveying the information can be of the asynchronous type, the information being carried in packets, whether it be data, digitized speech, or signalling.

Again—and advantageously—each of the above-described DST circuits has its own "intelligence" and its own data base to allow a decentralized management of the different DST functions.

Figure 3:
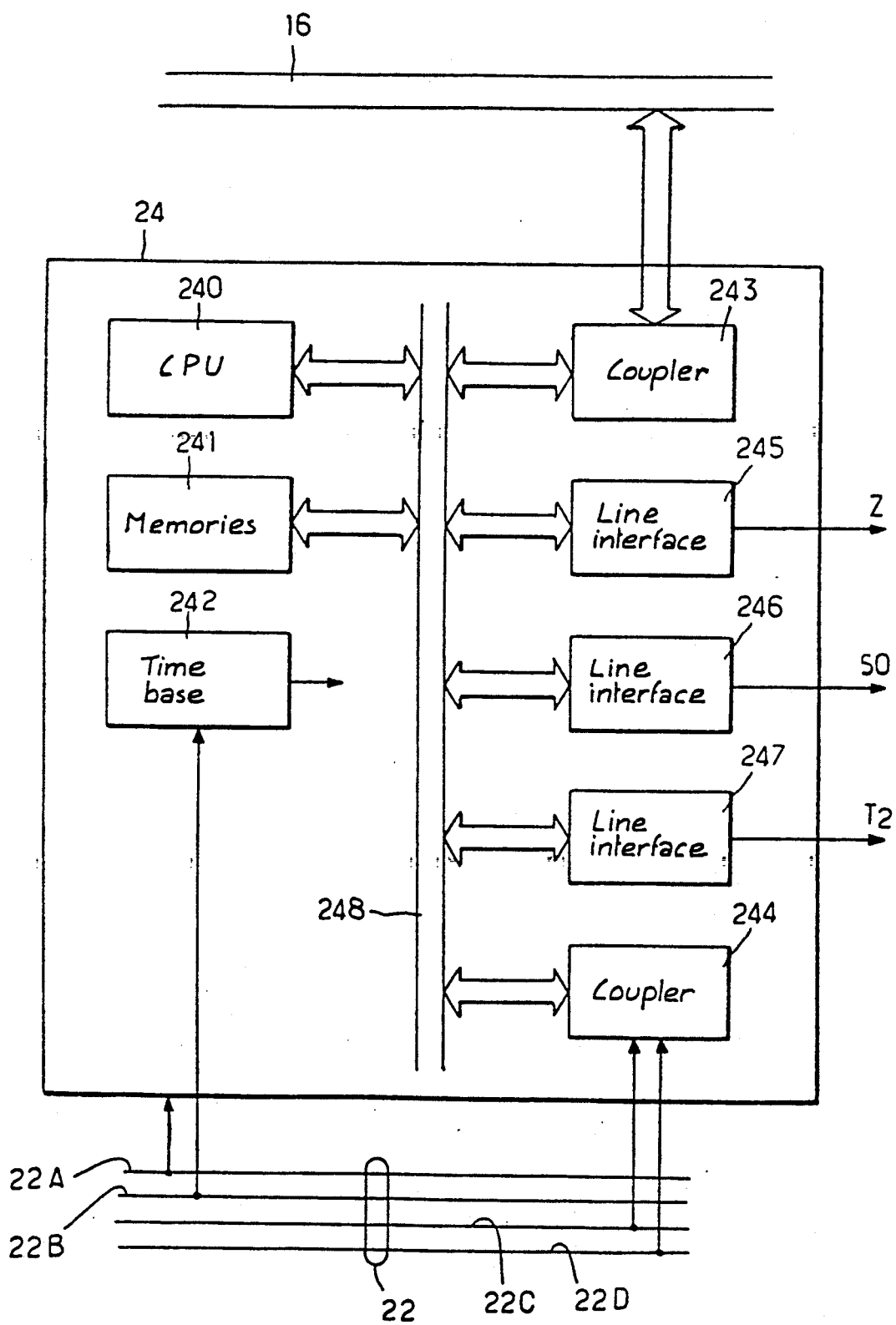
FIG. 3 is a more detailed diagram of a line connection circuit.

Thus, as shown in FIG. 3, each circuit eg. 24 has its own central unit 240, memories 241 associated with the central unit, a synchronizable time base 242 connected to line 22-B and couplers 243, 244 for each of the two buses 16 and 22. In the example shown, the line connection circuit has interferences 245, 246, 247 of the Z and S0 types (for connection to terminals) and of the T2 type (for connection to the ISDN), and can thus form a self-contained DST. The central unit 240, memories 241, couplers 243, 244 and line interfaces 245, 246, 247 are interconnected by a bus 248 that is specific to the board.

The synthesis of a larger capacity DST implementing several boards is obtained by signalling exchanges between circuits using special-purpose channels of bus 22. With such a configuration, the proper operation of the DST 20 does not depend on a common central unit so that, should some fault occur in the DST, there would only be a localized disruption in the system.

As already shown, the integration of a DST 20 within a PC makes it possible to take advantage of the PC's computing potential to assign a certain number of tasks to the latter, such as billing, the setting up of a communications logbood, and communications flow measurements, protocol conversions, configuration and installation (especially the configuration of audioconference circuits), maintenance, directory data storage, etc.

Of course, circuits or boards forming an ISDN DST other than those described above can also be integrated into a PC.

What is claimed is:

1. A microcomputer comprising:
   first electronic circuit boards on which are fitted first circuits for carrying out central processing unit, memory, and input/output functions, and which are interconnected by a first bus, and
   at least one second electronic circuit board having interface circuits for connecting a plurality of terminals to an Integrated Service Digital Network (ISDN) through line means,
   means being provided for switching of data transmitted over said line means so as to constitute an ISDN Digital Subscriber Terminal (DST) integrated within the microcomputer,
   wherein management and switching of data transmission over said line means and signalling required for exchanging said data are carried out by means of management and switching circuits provided on said at least one second electronic circuit board without calling on the resources of the central processing unit of the microcomputer.

2. A microcomputer according to claim 1, and which includes several second electronic circuit boards that are connected to said first bus to communicate with said first circuits, and that are interconnected with each other by means of a second bus that is separate from said first bus.

3. A microcomputer according to claim 2, wherein said second bus includes at least one line means grouping data transmission channels of which at least one constitutes a telephone signalling channel.

4. A microcomputer according to claim 3, wherein said data transmission channels carry time division multiplex channels.

5. A microcomputer according to claim 3, wherein access to the signalling channel with a contention protocol or is arbitrated.

6. A microcomputer according to claim 2, wherein said second bus has an independent power supply distribution line means, the power supply distribution to said first circuits being provided by another power supply distribution line means, whereby power supply to said second circuit boards may be maintained when power supply to said first circuits is turned off.

7. A microcomputer according to claim 2, wherein said second bus includes an independent time base distribution line means, the supply of a time base to said first circuits being provided by another time base distribution line means.

8. A microcomputer according to claim 2, wherein said management and switching circuits are distributed over a plurality of said second electronic circuit boards, and each said second electronic circuit board includes its own central processing unit with associated memory means, means for coupling said central processing unit and said memory means to said first bus, means for coupling said central processing unit and said memory means to said second bus, and line interface circuits.

9. A microcomputer which comprises means including a plurality of first circuit boards interconnected by a first bus for carrying out central processing unit, memory, and input/output functions, and which has integrated therein a plurality of Integrated Service Digital Network (ISDN) Digital Subscriber Terminal (DST) circuit boards connected to said first bus, interconnected with each other via a second bus which is independent of said first bus, and having data management and switching circuit means for enabling DST telephone switching independently of said first bus, with each said ISDN DST circuit board including a central processing unit with associated memory means, means for coupling said central processing unit and said memory means to said first bus, means for coupling said central processing unit and said memory means to said second bus, and line connection circuit means including a plurality of telephone line interface circuits for connection to at least one telephone line.

10. A microcomputer according to claim 9, including a circuit board with data processing circuit means for effecting data crossover between said first bus and said second bus.

11. A microcomputer according to claim 9, wherein said second bus includes power supply distribution line means for supplying electrical power to said ISDN DST circuit boards independently of electrical power supply to said first circuit boards, such that said ISDN DST circuit boards may remain operational to enable continued telephone functions when power supply to said first circuit boards is turned off.

12. A microcomputer according to claim 9, wherein said second bus includes time base distribution line means for supplying a time base to said ISDN DST circuit boards independently from a time base supplied to said circuit boards.

* * * * *